April 6, 1965
E. E. ZIEGLER
3,177,109
FIREPROOFED LARGE CELLED POLYSTYRENE
MATERIAL AND METHOD THEREFOR
Filed Jan. 18, 1960
2 Sheets-Sheet 2
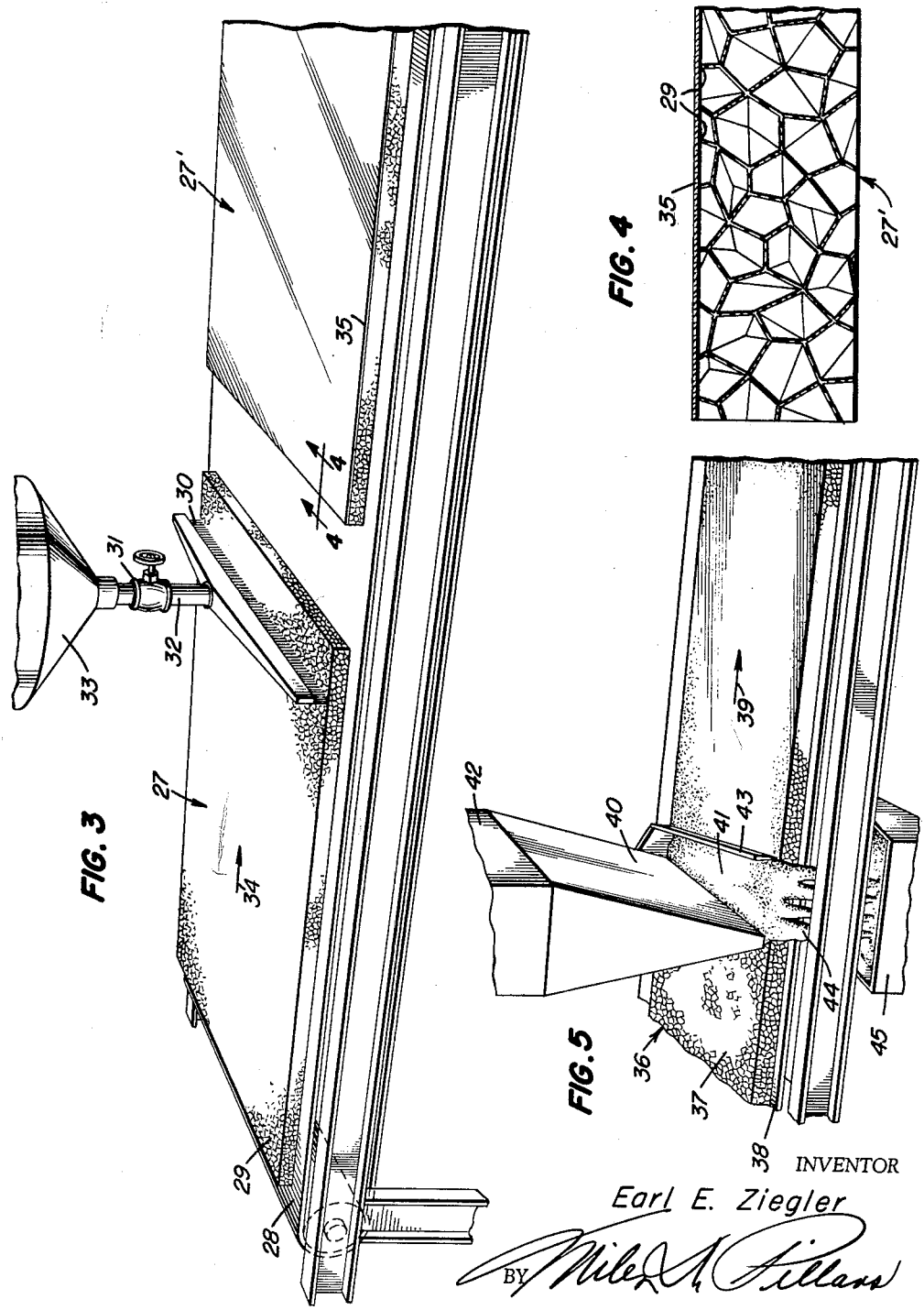
INVENTOR
Earl E. Ziegler
BY
ATTORNEY

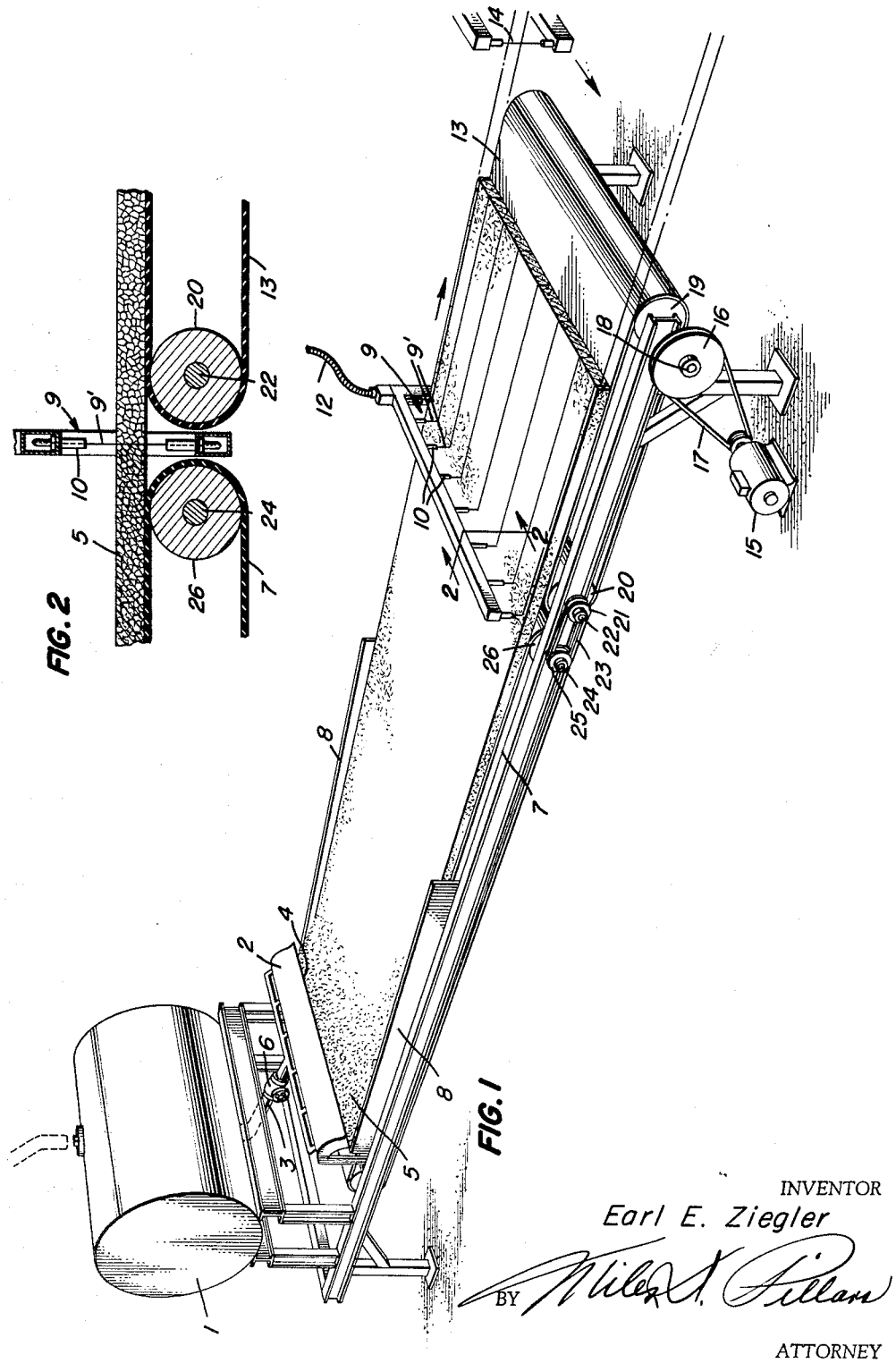

United States Patent Office 3,177,109
Patented Apr. 6, 1965

3,177,109
FIREPROOFED LARGE CELLED POLYSTYRENE
MATERIAL AND METHOD THEREFOR
Earl E. Ziegler, 1001 W. Sugnet Road, Midland, Mich.
Filed Jan. 18, 1960, Ser. No. 2,885
15 Claims. (Cl. 161—161)

This invention relates to large celled material, and particularly to an improved large celled substantially transparent thermoplastic material and methods and apparatus for making panels of such material and to panels so made having a relatively thin sheet or coating of smooth transparent or opaque material, on a side thereof, which material may be light and short wave infrared radiation transmitting or may be sound absorbing.

In the past, many different types of panels have been made of foamed material, many of which have been provided with skins or sheets over the sides of the foamed material, either bonded thereto or simply as boundary layers for the foam core. In most instances, the foam has comprised material having very minute voids dispersed throughout the material in a substantially uniform manner.

Nucleated or very small celled polystyrene or similar foam has often been used in making rigid panels and similar structures. Foam of this type has the disadvantage of being substantially opaque, unless very thin layers are used. It, therefore, is not very practical for use as a light or infrared radiation transmitting material. It does have the advantage of being a fairly good insulating material, but may have a relatively high density and consequently may be a fairly heavy material for any given size panel. For many uses it is desirable to have relatively light-weight, light or short wave infrared radiation, or both, transmitting panels, which also are good thermal insulators. For certain applications it is desirable that the panels should be sound absorbing, and for many uses the exposed surfaces of the panels should have even smooth surfaces.

According to the present invention, panels are formed of substantially transparent thermoplastic material which is extruded by expansion of the material from a reservoir through suitable orifices into the form of large thin-walled cells of substantially uniform size. Such expanded thermoplastic material forms a conglomerate of interlocking polyhedral cells having united outer surfaces or common walls. The size of the cells in such a conglomerate generally may be controlled by the percentage of expanding material, usually methyl chloride, mixed with the plastic in the reservoir from which the material is fed to the extruding orifices. The size of the cells can also be controlled by the size of the orifices through which the material is extruded and expanded.

An object of this invention is to provide an improved large celled material.

Another object of this invention is to provide an improved cellular material having large thin-walled cells which has sufficient mechanical strength and rigidity to span distances of several feet without appreciable deformation or collapse.

A further object of this invention is to provide a cellular material having large thin-walled polyhedral cells, and which transmits light and/or short wave infrared radiations, while absorbing long wave radiations and providing good thermal insulation.

Yet another object of this invention is to provide an improved large celled material which is substantially light stable, capable of transmitting a large percent of incident light and/or short wave infrared radiation, while providing a substantial amount of light diffusion and having the property of being self-fire-extinguishing.

A yet further object of this invention is to provide an improved process of making a conglomerate of thin-walled large polyhedral cells of transparent plastic material by an extrusion process.

Still another object of this invention is to provide improved apparatus for forming large celled thin-walled conglomerate into either translucent or opaque sound-absorbing panels.

Further objects and advantages of this invention will become apparent from the following description referring to the accompanying drawings, and the features of novelty which characterize this invention will be pointed out with particularity in the claims appended to and forming a part of this specification.

In the drawings:

FIG. 1 is a perspective view schematically illustrating the basic elements of apparatus for manufacturing hollow thin-walled large celled foamed conglomerate and for trimming it to desired finished dimensions by a continuous process;

FIG. 2 is an enlarged sectional view, taken along line 2—2 of FIG. 1, showing details of a hot wire cutting device used for trimming conglomerate to desired dimensions;

FIG. 3 is a perspective view, partly broken away, illustrating apparatus for applying adhesive to a trimmed surface of a panel made by apparatus such as that shown in FIG. 1 and further showing the manner in which a transparent skin or sheet may then be applied and adhered to the surface of the panel to which the adhesive has been applied;

FIG. 4 is an enlarged sectional view, taken along line 4—4 of FIG. 3, illustrating the general appearance of the heterogeneously arranged polyhedral cells to which a skin has been applied over one trimmed surface thereof; and FIG. 5 is a perspective view, partly broken away, schematically illustrating apparatus for continuously applying a thin coating of sound-absorbing material to a trimmed surface of a panel made by the apparatus shown in FIG. 1.

Referring to the drawings, FIG. 1 illustrates equipment for making an improved large-celled light and/or short wave infrared radiation transmitting and thermal insulating material in accordance with this invention, wherein panels cut to desired dimensions may be made by a continuous process. It has been found that when certain transparent thermoplastic materials, such as polystyrene, methyl methacrylate, a methyl methacrylate-styrene copolymer, and a styrene-acrylonitrile copolymer, are impregnated with methyl chloride or other suitable fugaceous blowing agent in a closed reservoir so that the mixture is pressurized, release of the mixture through suitable orifices to atmosphere will expand the material so as to form a conglomerate of large polyhedral cells heterogeneously arranged and having common walls extending at various angles. The thermoplastic material thus expanded will be substantially translucent and will set and solidify in air at room temperatures in a relatively short time. A very good mixture for the formation of such large celled foam which provides a finished product having a very pleasing honeycombed aesthetic appearance, with good light diffusion and light diffraction properties, can be obtained by mixing mineral oil as a lubricant with polystyrene containing about 11 percent of methyl chloride as a blowing agent, and to which about 4½ percent acetylene tetrabromide has been added as a self fire-extinguishing agent, with about 0.15 percent of a hydroxy benzophenone, such as Uvinol D-49, as a light stabilizer.

The desired mixture of thermoplastic material and foaming or blowing agent, such as methyl chloride, are placed in a closed reservoir 1, which is adapted to retain the mixture under a predetermined desired pressure.

Eleven parts of methyl chloride per hundred parts of polymer has been found to give very good large cell foaming to polystyrene. Such a mixture is adapted to be fed from the reservoir 1 to a foaming or extruding head 2 through a suitable conduit 3. The thermoplastic mixture is adapted to be fed through suitable extruding orifices in the head 2 which provide for expansion of the thermoplastic mixture as it is fed to atmosphere and out of the nozzle end 4 of the head 2.

With this arrangement the pressurized mixture, which is fed from the reservoir 1 through the orifices in the head 2, expands into large thin-walled cells which accumulate in a heterogeneous mass within the head 2 and pass from the nozzle end thereof as a conglomerate 5 of large hollow polyhedral cells having common walls extending in many different directions. The rate at which the conglomerate 5 is formed can be conveniently controlled by a suitable valve 6 arranged in the conduit 3 for controlling the rate of flow of the thermoplastic mixture from the reservoir 1 to the extruding head 2.

In order to provide for the continuous manufacture of the large celled material as a layer of predetermined dimensions, a suitable conveyor belt 7 extends under the extruding head 2 and passes longitudinally away from this end of the equipment so as to receive and carry away the foamed or expanded large celled thermoplastic material 5 as it is fed from the extruding head. The foamed material is retained on the conveyor belt 7 by sideboards 8 arranged on each side of the belt adjacent to the extruding head, and thus limit the spread of the foamed material to a predetermined desired width. By regulating the speed at which the conveyor belt 7 is driven, any desired depth of expanded material can be uniformly deposited upon the belt.

Such expanded thermoplastic material normally will set and harden in a relatively short time when exposed to air at normal room temperatures. The conveyor belt 7 is, therefore, made long enough to hold the conglomerate until it has sufficiently solidified so that it readily can be cut or trimmed to desired dimensions.

In a preferred embodiment of apparatus for continuously manufacturing panels in accordance with the present invention, solidified conglomerate is adapted to be cut or trimmed to the desired width in any suitable manner, as by saws or electrical hot wire cutters 9. As shown in FIG. 2, such hot wire cutters may comprise an electrical conductor 9' which is held taut between a pair of terminal members 10 and 11 connected across a suitable source of electrical power supply 12. Such hot wire cutters do not form part of the present invention and are merely shown as illustrative of any suitable means for cutting the conglomerate.

In the equipment shown in FIGS. 1 and 2, the hot wire cutters 9 are conveniently mounted at the end of the conveyor belt 7 away from the foaming head 2, and a second conveyor belt 13 is arranged to extend from adjacent to the hot wire cutters 9 to any desirable length longitudinally away from these cutters. The finished dimensions of panels formed from the conglomerate can readily be obtained by suitably arranging other cutters which are adapted to cut or trim the conglomerate as it is delivered by the belt 13 to any desirable length and also to cut or trim the conglomerate to any desired depth or thickness.

As shown in FIG. 1, a transversely movable hot wire cutter 14, similar to the hot wire cutters 9, may be used to cut or trim the conglomerate to the desired length. A similarly constructed horizontally extending cutter may be used to cut the conglomerate to the desired thickness. In some instances, where the conglomerate has first been cut to the desired width by cutters 9 and then been cut to the desired length by a transversely operable cutter 14, it may be found desirable separately to trim or cut the individual panels to the desired depth or thickness. Since the depth of the conglomerate manufactured by the equipment shown in FIG. 1 can readily be controlled, unfinished panels may be cut from the conglomerate having a depth or thickness ranging from fractions of an inch to possibly two or more feet. Thin panels can very readily be cut from thick unfinished panels by any suitable battery of cutting devices or by individually cutting each panel separately from a length of conglomerate which has been cut from the forming equipment shown in FIG. 1.

In order to maintain the continuity of operation of the panel forming equipment, the conveyor belts 7 and 13 in FIG. 1 are adapted to be driven at substantially the same speed by any suitable means, such as an electric motor 15, which is connected to a driving pulley 16 through a suitable belt 17. The pulley 16 is mounted on a shaft 18 which drivingly supports a roller 19, which engages and drives the conveyor belt 13. Movement of the belt 13 drives a roller 20 at the far end of the belt 13 adjacent to the hot wire cutters 9, and a pulley 21 is drivingly mounted on a shaft 22 which supports the rollers 20 for transmitting power through a suitable belt 23, which drivingly engages another pulley 24 mounted on a shaft 25 which supports a third roller 26. In this manner, the roller 26 is operated at substantially the same speed as the roller 20 and the roller 19 and drives the belt 7 at substantially the same speed as the belt 13.

As is more clearly shown in FIG. 2, the ends of the two conveyor belts 7 and 13 which extend respectively over the pulleys 26 and 20 are spaced apart sufficiently to allow the lower ends of the wire cutters 9 to be arranged between the ends of the belts without interference therewith. Such an arrangement also has the advantage that it provides for the discharge of material which is cut or trimmed from the conglomerate as it is being cut by the hot wire cutters.

Fully cut and trimmed panels made by equipment such as that shown in FIGS. 1 and 2 will have open-sided cells along each of the trimmed surfaces and edges of the panels. For certain purposes, such panels may be used without further finishing. In many instances, however, it will be found desirable to provide a thin sheet or coating over the open-sided cell surfaces which are left exposed. Translucent light and/or short wave infrared radiation transmitting panels having desired light diffusion and diffraction properties and which are good thermal insulators can be made by arranging relatively thin sheets or skins of transparent material, such as glass or suitable plastic, over the open-sided cell surfaces of the panels. These sheets or skins may merely be mechanically arranged over the surfaces of the panels and held in position by suitable retaining means, such as frames or channels, or they may be made an integral part of the panel by being suitably adhered to the surfaces and edges of the cells along the open-sided cell surface which is covered by the sheets or skins.

FIG. 3 illustrates a convenient production line method of assembling trimmed panels to which substantially even smooth sheets or skins are adherently secured. As shown in this figure, a trimmed panel 27 is placed on a suitable conveyor belt 28 with the trimmed open-sided cell surface 29 to which the sheet is to be adhered facing upwardly. The belt 28 will carry the panel 27 under an adhesive distributing brush 30, which wipes a thin film of substantially transparent adhesive material, such as an epoxy resin, onto the exposed surfaces and edges of the open-sided cells of the panel 27. The rate of flow of adhesive through the brush 30 should be relatively slow in order to insure only a very light coating of adhesive on the edges of the cells, and such flow can conveniently be regulated by a suitable valve 31 arranged in a conduit 32 which supplies adhesive to the brush 30 from a suitable reservoir 33. The position of the adhesive distributing brush 30 can be varied in any suitable manner by moving it vertically to adjust for different thicknesses of panels to which the adhesive is to be applied.

With this arrangement of apparatus, a panel 27 will be moved as indicated by the arrow 34 until adhesive has been applied to all of the exposed cell edges and surfaces along the panel surface 29, after which the panel will move away from the adhesive distributing brush 30, as shown by the position of the panel 27'. After a panel moves completely away from the brush 30, a suitable thin sheet or skin 35 is laid over the surface 29 so that it becomes evenly adhered to all parts of this surface. If desired, the upper surface of the sheet or skin 35 may be rolled or brushed with a light pressure, so as to assure a complete engagement of the underside of the sheet or skin 35 with the adhesive on the exposed open-sided edges and surfaces of the cells along the panel surface 29. Quite often, it will be found desirable to have a skin 35 on both of the wide surfaces of a panel, and the second skin can be secured in position in the same manner as skin 35 simply by turning the panel over and repeating the adhesive and skin applying procedure. A completed panel provides an aesthetically very pleasing heterogenously formed and arranged honeycomb cell effect, as is more clearly shown in the enlarged view of FIG. 4.

For certain purposes, very pleasing color effects also can be obtained as a result of the diffraction properties of the large polyhedral cells with unequal walls extending in various directions, and these effects may be accentuated by the addition of non-pigmented coloring, such as dyes, added either to the thermoplastic material of which the cellular panel is made or to the material forming the thin sheet or skin 35. These color effect panels can be used wherever colored lighting is desired, especially where a soft diffusion of the light is sought. In addition, such panels are very practical where stained glass windows have been used in the past, and may also be found very practical and ornamental as translucent panels for various building purposes, as in shower stalls and the like.

For certain building purposes it is especially practical to provide panels with sound-absorbing characteristics. Such panels usually are attached within buildings for acoustic improvement, where it is highly desirable that the weight of such panels be maintained at a minimum. It is highly important, therefore, that the specific gravity and density of the material comprising the panel should be as low as possible. Large celled conglomerates of the type produced by the present invention are particularly adaptable for use as such light-weight sound-absorbing panels.

FIG. 5 illustrates apparatus for finishing a panel made by equipment such as that shown in FIGS. 1 and 2 to make it particularly sound absorbing, if desired. In this arrangement, a panel 36, which has been cut and trimmed to the desired size so that it presents an open-sided cell surface 37, is placed on a suitable conveyor belt 38 with the surface 37 facing upwardly. The conveyor belt then is operated so as to carry the panel 36 in the direction of the arrow 39 and to pass the open-sided cell surface 37 under a suitable material distributing nozzle 40 which extends into close proximity to the upper surface 37. Coating material 41, which may comprise any suitable dense substance such as cement or plaster, including Portland cement, formed as a flowable slurry, can be supplied to the distributing nozzle 40 from a suitable reservoir 42. Such dense material 41 will penetrate into the open-sided cells and substantially fill such cells so as to become securely anchored therein.

In some instances, it may be desirable to remove all of the excess material which extends beyond the trimmed edges of the cellular panel, while in other instances it may be found desirable to allow a relatively thin coating of the dense material to form an even smooth surface completely covering the open-sided cell surface 37. Such a thin coating is advantageously securely fastened to the cellular panel by the material which extends into and is anchored in the open-sided cells. In either case, excess material may conveniently be removed from the panel by a wiping board 43 which extends transversely across the panel at an angle to the nozzle 40 and at a height with reference to the surface 37 of the panel so as to regulate the amount of material which is left on this panel surface as the panel is drawn under the wiping board 43. Excess material 44 removed by the wiping board 43 will simply flow off the panel 36 and can be collected in a suitable sump 45 arranged under the conveyor belt 38.

For some uses, it may be found desirable to apply a substantially transparent material in place of the dense sound-absorbing material 41, and this may be done in the same manner as has been explained with reference to the sound-absorbing material. In either case, the finished coated panel can be made in any desired color simply by adding a suitable coloring material to the coating material 41. Panels of this type may be manufactured at such a relatively low cost as to make it more practical simply to replace complete curtain walls formed of such colored panels rather than to redecorate the walls by painting, papering, or otherwise covering the surfaces of such walls.

While particular embodiments of this invention have been illustrated and described, modifications thereof will occur to those skilled in the art. It is to be understood, therefore, that this invention is not to be limited to the particular arrangements and structures disclosed, and it is intended in the appended claims to cover all modifications within the spirit and scope of this invention.

I claim:

1. A cellular material comprising large celled foam formed of substantially transparent thermoplastic polystyrene material lubricated with mineral oil and containing about 4½ percent acetylene tetrabromide and 0.15 percent of substituted benzophenones, the cells of said foam being generally polyhedral and having an average size between ¼ inch and 1 inch with common walls heterogeneously arranged providing good light transmissibility with diffusion which eliminates direct light transmission and view therethrough with a minimum of light and short wave infrared radiation absorption, said material being substantially color stable under exposure to light and a good heat insulator.

2. Material as set forth in claim 1 wherein said thermoplastic material comprises a styrene-acrylonitrile copolymer.

3. Material as set forth in claim 1 wherein a non-pigmented coloring has been added to said material.

4. A relatively thin cellular sheet panel comprising a pair of light and infrared transmitting skins arranged in spaced relation, a core of large celled foam of substantially transparent thermoplastic material formed of a polystyrene lubricated with mineral oil and containing about 4½ percent acetylene tetrabromide and 0.15 percent of substituted benzophenones arranged between said skins, and the cells of said foam core having common walls with the cell walls heterogeneously arranged providing good light transmissibility with diffusion which eliminates direct light transmission and view therethrough with a minimum of light absorption.

5. A cellular panel as set forth in claim 4 wherein said panel has relatively wide outer faces and relatively narrow edge surfaces, said panel comprising multiple layers of cells formed of substantially transparent material and having common walls with the cell walls heterogeneously arranged providing good light transmissibility with diffraction which eliminates direct light transmission and view therethrough, said material being self fire-extinguishing and substantially color stable under exposure to light, said cells being generally polyhedral with the sides thereof of various sizes and having an average cell size between ¼ inch and 1 inch and wherein the cells on at least one of the relatively wide outer faces are generally outwardly open-sided.

6. A panel as set forth in claim 5 wherein a substantially transparent material extends into and is anchored in said open-sided cells along at least one outer surface and extends as a smooth thin layer completely covering said one surface of said panel.

7. A panel as set forth in claim 5 wherein a substantially opaque sound-absorbing material fills said open-sided cells on both sides of said panel.

8. A panel as set forth in claim 5 wherein a substantially opaque sound-absorbing material fills said open-sided cells on one side of said panel.

9. A panel as set forth in claim 5 wherein a substantially transparent sound-absorbing material fills said open-sided cells on one side of said panel.

10. A panel as set forth in claim 5 wherein a sound-absorbing material extends into and is anchored in said open-sided cells along one surface of said panel and extends as a smooth thin layer completely covering said one surface of said panel.

11. A panel as set forth in claim 10 wherein said sound-absorbing material is on both side surfaces of said panel.

12. A panel as set forth in claim 10 wherein said sound-absorbing material is a plaster.

13. A panel as set forth in claim 10 wherein said sound-absorbing material is a cement.

14. A panel as set forth in claim 13 wherein said cement is Portland cement.

15. The process of making a conglomerate of hollow thin-walled large polyhedral cells of thermoplastic material comprising expanding a mixture of polystyrene and about 11 percent methyl chloride with mineral oil added to the polystyrene as a lubricant, about 4½ percent acetylene tetrabromide as a self-extinguishing agent, and about 0.15 percent of a hydroxy benzophenone as a light stabilizer, arranging said conglomerate as a layer of multiple cell depth, allowing the cell walls in said layer to set and harden, and trimming the layer to desired dimensions.

References Cited by the Examiner
UNITED STATES PATENTS

| | | |
|---|---|---|
| 2,450,436 | 10/48 | McIntire. |
| 2,626,886 | 1/53 | Scholl. |
| 2,676,927 | 4/54 | McCurdy et al. |
| 2,850,890 | 9/58 | Rubenstein _____ 161—161 |
| 2,888,360 | 5/59 | Sherts et al. |
| 2,923,030 | 2/60 | Himmelheber et al. ____ 156—256 |
| 2,928,456 | 3/60 | Potchen et al. |

EARL M. BERGERT, *Primary Examiner.*

CARL F. KRAFFT, *Examiner.*